United States Patent
Masuda et al.

(10) Patent No.: US 11,897,488 B2
(45) Date of Patent: Feb. 13, 2024

(54) AUTONOMOUS DRIVING ASSISTANCE METHOD AND DEVICE

(71) Applicant: DENSO CORPORATION, Kariya (JP)

(72) Inventors: Kouichi Masuda, Kariya (JP); Hiroshi Ishikawa, Kariya (JP); Takahisa Yokoyama, Kariya (JP); Takehito Fujii, Kariya (JP)

(73) Assignee: DENSO CORPORATION, Kariya (JP)

(*) Notice: Subject to any disclaimer, the term of this patent is extended or adjusted under 35 U.S.C. 154(b) by 212 days.

(21) Appl. No.: 17/646,273

(22) Filed: Dec. 28, 2021

(65) Prior Publication Data

US 2022/0135056 A1 May 5, 2022

Related U.S. Application Data

(60) Division of application No. 16/682,356, filed on Nov. 13, 2019, now Pat. No. 11,338,818, which is a
(Continued)

(30) Foreign Application Priority Data

May 16, 2017 (JP) .................... 2017-096910

(51) Int. Cl.
*B60W 50/02* (2012.01)
*B60W 60/00* (2020.01)
(Continued)

(52) U.S. Cl.
CPC ........ *B60W 50/0205* (2013.01); *B60W 30/08* (2013.01); *B60W 30/181* (2013.01);
(Continued)

(58) Field of Classification Search
CPC ....... B60W 50/0205; B60W 60/00186; B60W 2050/007; B60W 2050/0215;
(Continued)

(56) References Cited

U.S. PATENT DOCUMENTS

2003/0055550 A1 3/2003 Lohberg et al.
2008/0319622 A1 12/2008 Katrak et al.
(Continued)

FOREIGN PATENT DOCUMENTS

JP H05-058323 A 3/1993
JP H06-307989 Ajp 11/1994
(Continued)

OTHER PUBLICATIONS

U.S. Appl. No. 16/682,356 and its entire file history, filed Nov. 13, 2019, Masuda et al..

*Primary Examiner* — Nadeem Odeh
(74) *Attorney, Agent, or Firm* — MASCHOFF BRENNAN

(57) ABSTRACT

An autonomous driving assistance device includes a manual driving control section, an autonomous driving control section, and a travelling condition determining section. If it is detected that there is a malfunction in a first sensor during control of the autonomous driving of the vehicle, the autonomous driving control section executes emergency autonomous driving until a predetermined condition is satisfied while changing, based on the determined travelling condition, a driving manner of an emergency autonomous driving as compared with a driving manner of the autonomous driving executed before no malfunctions are detected in the first sensor; and after the emergency autonomous driving is terminated, the autonomous driving assistance device being configured to selectively execute one of: causing the autonomous driving control section to stop the vehicle; and causing the manual driving control section to control the manual driving.

1 Claim, 8 Drawing Sheets

Related U.S. Application Data continuation of application No. PCT/JP2018/009967, filed on Mar. 14, 2018.

(51) Int. Cl.
*B60W 30/08* (2012.01)
*B60W 30/18* (2012.01)
*G05D 1/00* (2006.01)
*B60W 50/00* (2006.01)

(52) U.S. Cl.
CPC .. *B60W 60/0059* (2020.02); *B60W 60/00186* (2020.02); *G05D 1/0061* (2013.01); *G05D 1/0088* (2013.01); *B60W 2050/007* (2013.01); *B60W 2050/0215* (2013.01); *B60W 2520/14* (2013.01); *G05D 2201/0213* (2013.01)

(58) Field of Classification Search
CPC ............ B60W 2520/14; B60W 30/08; B60W 30/181; B60W 60/0059; B60W 2050/0072; B60W 2050/0292; B60W 50/029; B60W 60/0053; G05D 1/0061; G05D 1/0088; G05D 2201/0213; B60R 16/02; B60R 21/00; B60R 21/01; G08G 1/16

See application file for complete search history.

(56) References Cited

U.S. PATENT DOCUMENTS

| | | |
|---|---|---|
| 2011/0066321 A1 | 3/2011 | Bechtler et al. |
| 2016/0267725 A1 | 9/2016 | Chundrlik, Jr. et al. |
| 2016/0280191 A1 | 9/2016 | Okano et al. |
| 2018/0194364 A1 | 7/2018 | Asakura et al. |
| 2018/0297609 A1 | 10/2018 | Bozsik |

FOREIGN PATENT DOCUMENTS

| | | |
|---|---|---|
| JP | H09-226696 A | 9/1997 |
| JP | H10-016744 A | 1/1998 |
| JP | 10-76965 A | 3/1998 |
| JP | 2003-063373 A | 3/2003 |
| JP | 2003-525814 A | 9/2003 |
| JP | 2007-145113 A | 6/2007 |
| JP | 2008-116339 A | 5/2008 |
| JP | 2009-193347 A | 8/2009 |
| JP | 2010-115938 A | 5/2010 |
| JP | 2015-075899 A | 4/2015 |
| JP | 2015-162005 A | 9/2015 |
| JP | 2016-030513 A | 3/2016 |
| JP | 2016-84092 A | 5/2016 |
| WO | 2017010264 A1 | 1/2017 |

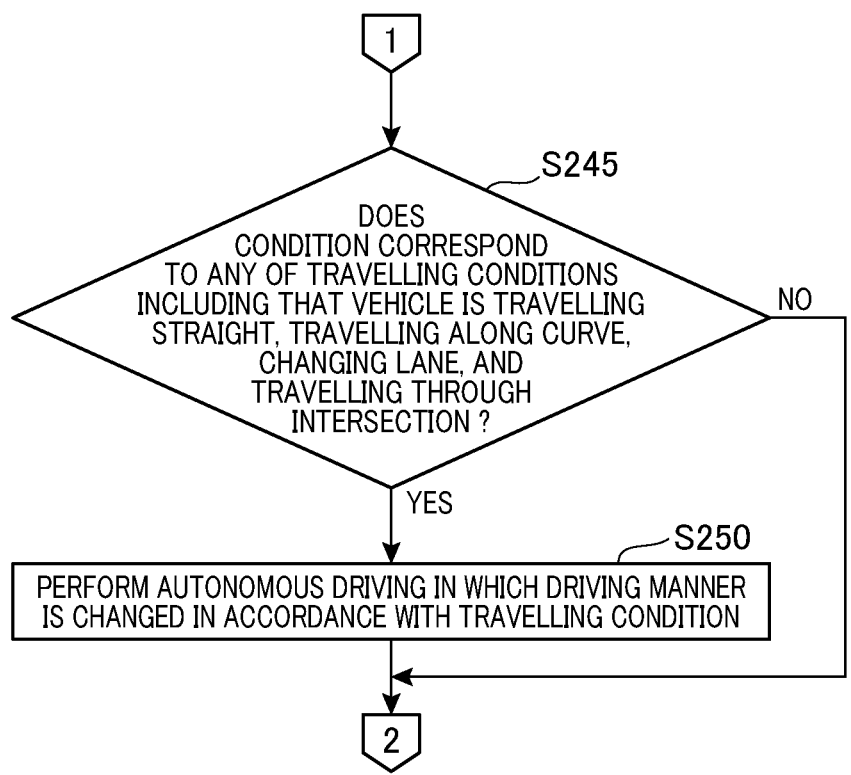

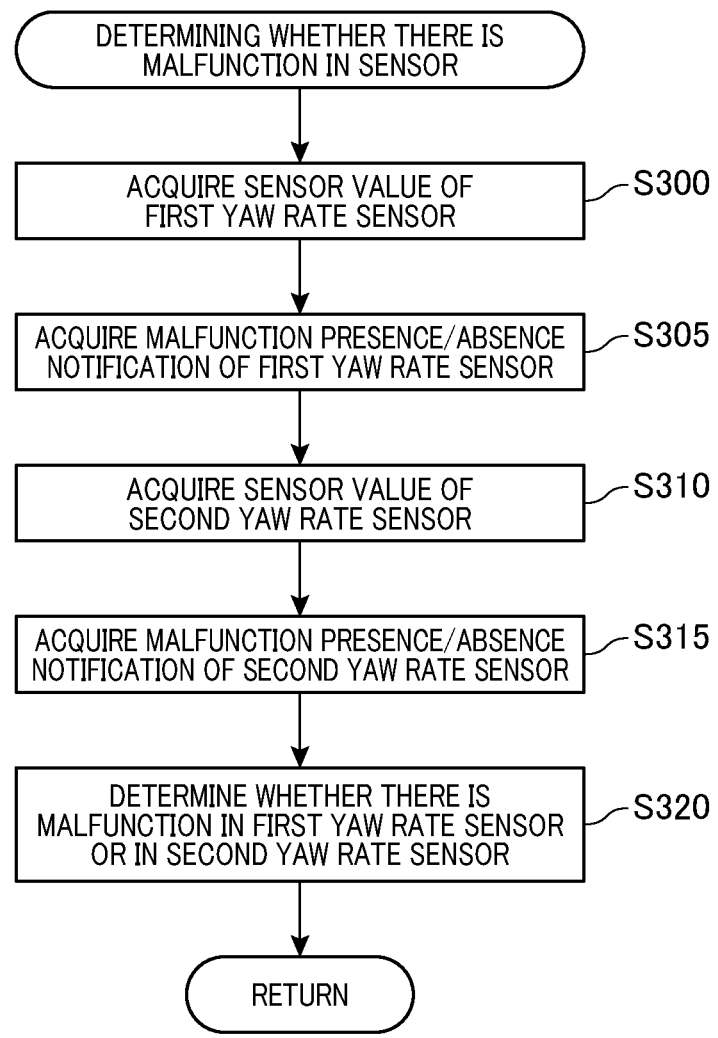

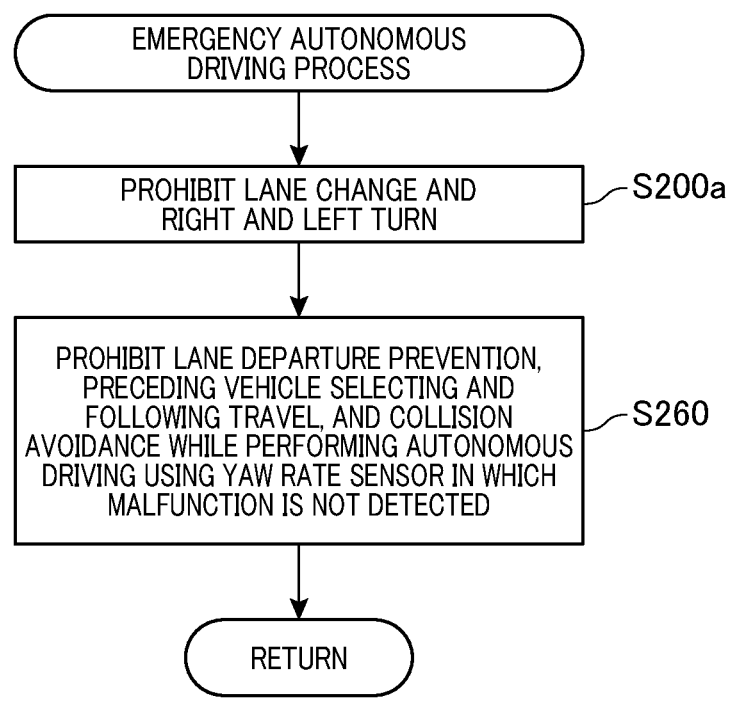

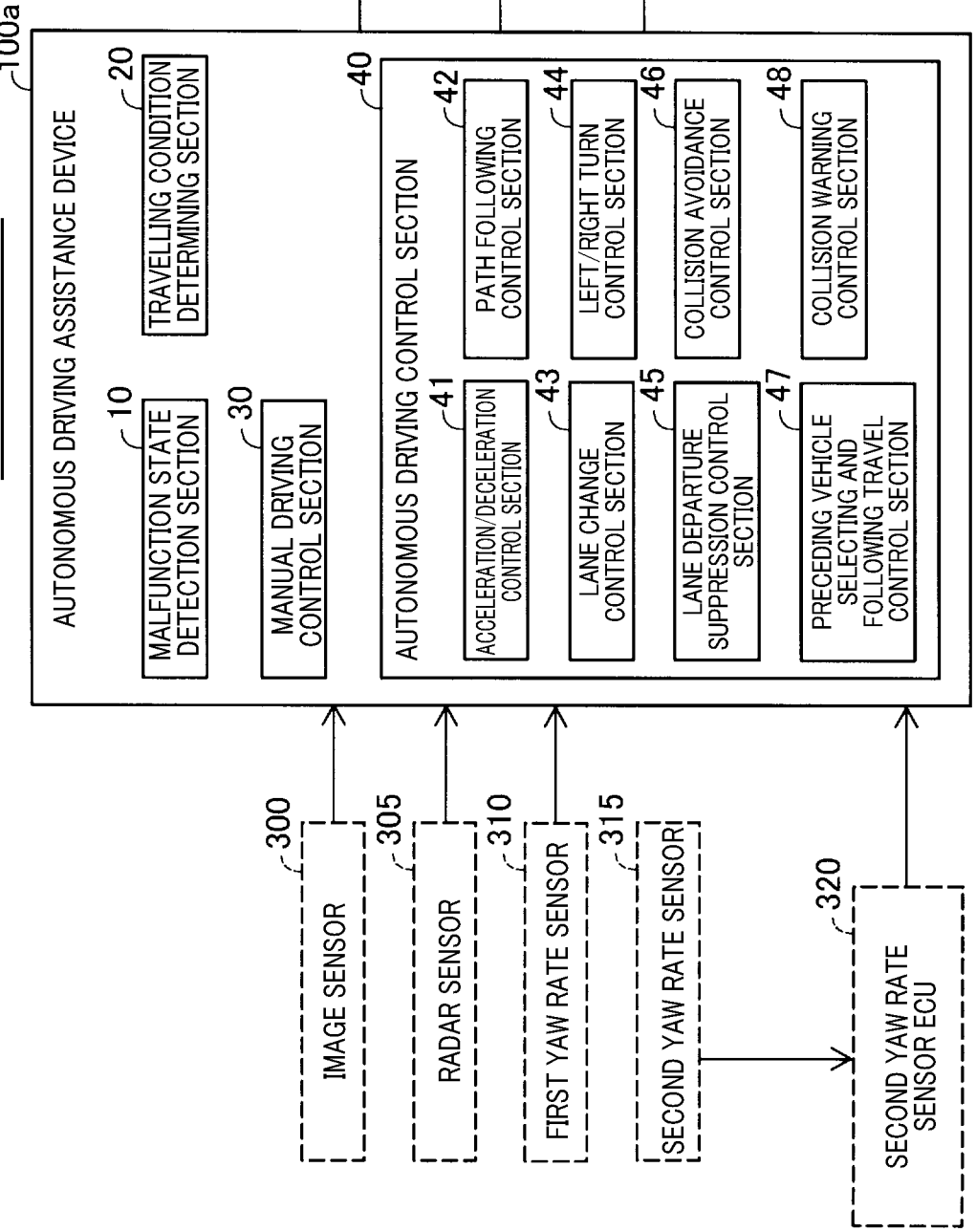

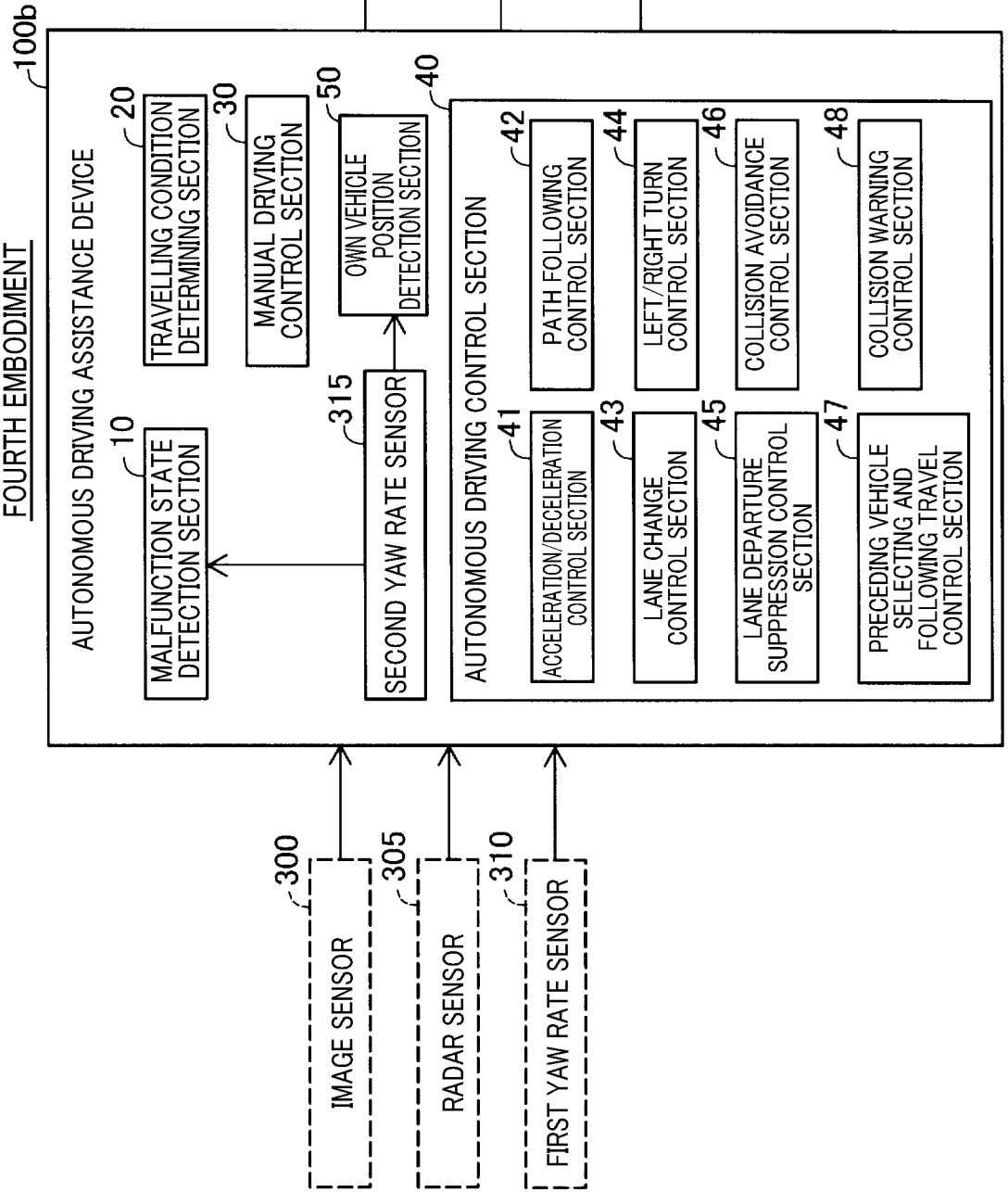

AUTONOMOUS DRIVING ASSISTANCE METHOD AND DEVICE

CROSS-REFERENCE TO RELATED APPLICATION

The present application is a divisional application of U.S. patent application Ser. No. 16/682,356, filed on Nov. 13, 2019, which is a continuation application of International Application No. PCT/JP2018/009967, filed Mar. 14, 2018, which claims priority to Japanese Patent Application No. 2017-96910, filed May 16, 2017. The contents of these applications are incorporated herein by reference in their entirety.

BACKGROUND

Technical Field

The present disclosure relates to an autonomous driving assistance device.

Background Art

Conventionally, autonomous driving assistance devices that perform automated travelling of a vehicle using detection results from, for example, sensors mounted on the vehicle have been proposed.

SUMMARY

In the present disclosure, provided is an autonomous driving assistance device as the following. If it is detected that there is a malfunction in a first sensor during control of an autonomous driving of the vehicle, an autonomous driving control section executes emergency autonomous driving until a predetermined condition is satisfied while changing, based on the determined travelling condition, a driving manner of an emergency autonomous driving as compared with a driving manner of the autonomous driving executed before no malfunctions are detected in the first sensor. After the autonomous driving is terminated, the autonomous driving assistance device being configured to selectively execute one of: causing the autonomous driving control section to stop the vehicle; and causing the manual driving control section to control the manual driving.

BRIEF DESCRIPTION OF THE DRAWINGS

The object of the present disclosure, other objects, features, and advantages of the present disclosure will become apparent from the following detailed description with reference to the accompanying drawings. In the accompanying drawings:

FIG. 4 is a flowchart showing a detailed processing procedure of the autonomous driving process during a malfunction condition;

FIG. 5 is a flowchart showing a detailed processing procedure of a process for determining whether there is a malfunction in a sensor according to a second embodiment;

FIG. 6 is a flowchart showing a detailed processing procedure of an autonomous driving process during a malfunction condition according to the second embodiment;

FIG. 7 is a block diagram illustrating a schematic configuration of an autonomous driving assistance device according to a third embodiment; and FIG. 8 is a block diagram illustrating a schematic configuration of an autonomous driving assistance device according to a fourth embodiment.

DETAILED DESCRIPTION OF THE PREFERRED EMBODIMENTS

Figure 1:
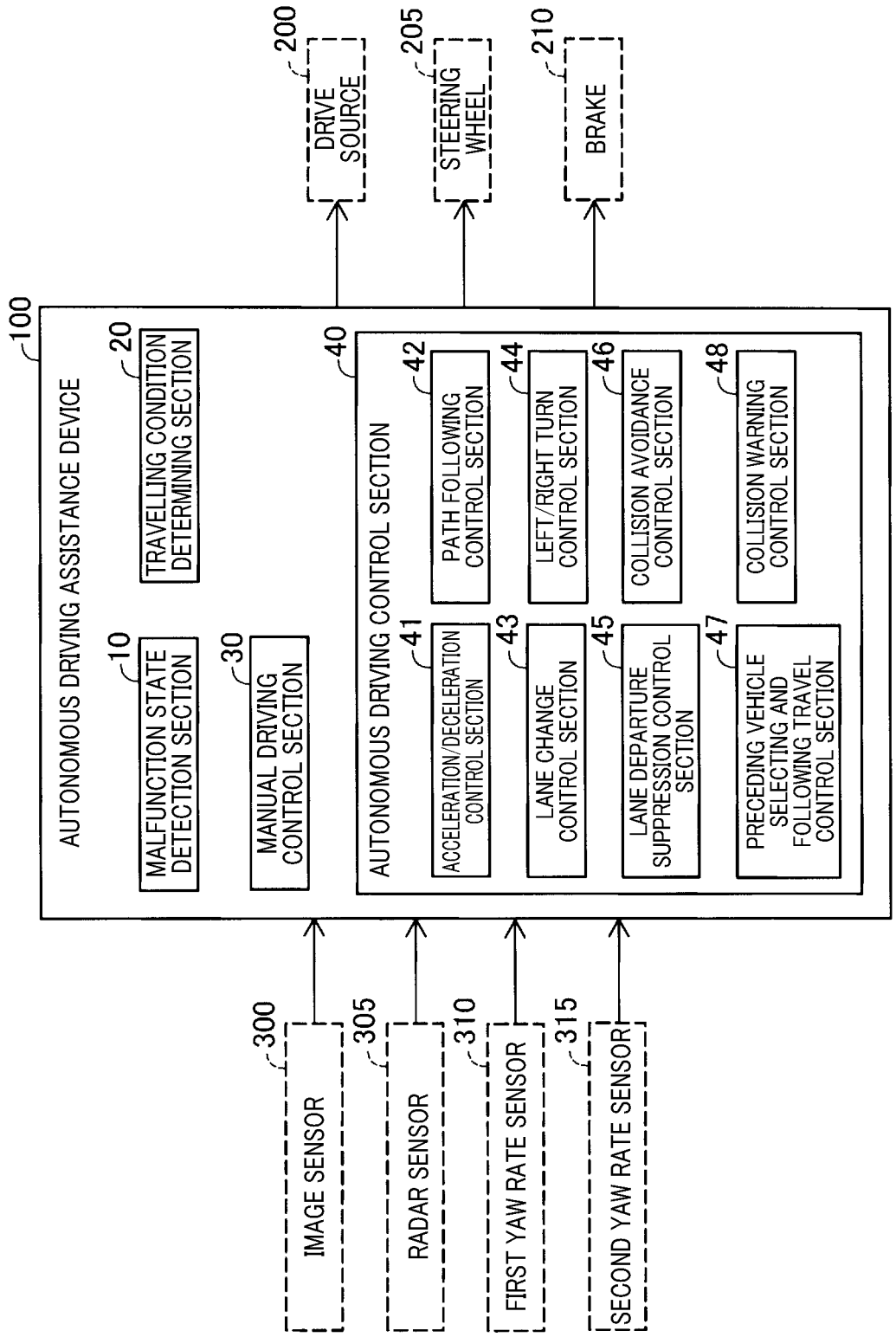
FIG. 1 is a block diagram illustrating a schematic configuration of an autonomous driving assistance device according to one embodiment of the present disclosure.

PTL 1 discloses an autonomous driving assistance device that continues automated travelling when travelling of the vehicle is hindered due to a malfunction in, for example, a sensor.

[PTL 1] Japanese Unexamined Patent Application Publication No. 2015-162005

However, the technique disclosed in PTL 1 continues autonomous driving of the vehicle without considering, for example, the surrounding condition of the own vehicle and the travelling state of the own vehicle even if a malfunction occurs in, for example, a sensor, and the travelling of the vehicle is hindered. This undesirably decreases safety. Furthermore, even if the autonomous driving is switched to manual driving by a driver when a malfunction occurs in, for example, a sensor, the safety while the autonomous driving is switched to the manual driving may be undesirably decreased. Given the circumstances, the autonomous driving assistance device requires techniques that inhibit the decrease in the safety of the autonomous driving while the autonomous driving is switched to the manual driving.

The present disclosure is made to solve at least some of the above problems and may be embodied in the following forms.

One embodiment of the present disclosure provides an autonomous driving assistance device installable to a vehicle. The autonomous driving assistance device includes a manual driving control section, an autonomous driving control section, a malfunction state detection section, and a travelling condition determining section. The manual driving control section controls the vehicle in accordance with manual driving by a driver of the vehicle. The autonomous driving control section controls autonomous driving of the vehicle using a detection result of a first sensor, which detects a travelling state of the vehicle or a surrounding condition of the vehicle. The malfunction state detection section detects whether there is a malfunction in the first sensor. The travelling condition determining section determines a travelling condition of the vehicle. If it is detected that there is a malfunction in the first sensor during control of the autonomous driving of the vehicle, the autonomous driving control section executes emergency autonomous driving until a predetermined condition is satisfied while changing, based on the determined travelling condition, a driving manner of the emergency autonomous driving as compared with a driving manner of the autonomous driving executed before no malfunctions are detected in the first sensor. After the autonomous driving is terminated, the autonomous driving assistance device being configured to selectively execute one of: causing the autonomous driving control section to stop the vehicle; and causing the manual driving control section to control the manual driving.

According to the autonomous driving assistance device of the embodiment, if it is detected that there is a malfunction in the first sensor during control of the autonomous driving of the vehicle, the autonomous driving control section executes emergency autonomous driving until a predetermined condition is satisfied while changing, based on the determined travelling condition, a driving manner of the emergency autonomous driving as compared with a driving manner of the autonomous driving executed before no malfunctions are detected in the first sensor. After the autonomous driving is terminated, the autonomous driving assistance device being configured to selectively execute one of: causing the autonomous driving control section to stop the vehicle; and causing the manual driving control section to control the manual driving. This inhibits the decrease in the safety of the autonomous driving while the autonomous driving is switched to the manual driving.

The present disclosure may be achieved in various forms. For example, the present disclosure may be achieved by an autonomous driving assistance method of a vehicle, a vehicle including an autonomous driving assistance device, or a computer program for achieving the device and the method.

A. First Embodiment

A1. Configuration of Device:

An autonomous driving assistance device 100 according to a first embodiment shown in FIG. 1 is installed in a non-illustrated vehicle and executes autonomous driving by controlling automated travelling of the own vehicle using detection results of, for example, sensors mounted on the vehicle. In the present embodiment, the autonomous driving assistance device 100 is constituted by an electronic control unit (ECU). The autonomous driving assistance device 100 includes a CPU, a ROM, and a RAM, which are not shown. When the CPU copies, into the RAM, control programs previously stored in the ROM to execute the control programs, the CPU functions as a malfunction state detection section 10, a travelling condition determining section 20, a manual driving control section 30, and an autonomous driving control section 40. Furthermore, the autonomous driving assistance device 100 is electrically connected to an image sensor 300, a radar sensor 305, a first yaw rate sensor 310, a second yaw rate sensor 315, a drive source 200, a steering wheel 205, and a brake 210.

The image sensor 300 is mounted inside or outside a passenger compartment of the own vehicle and takes images of the surrounding condition of the own vehicle. The radar sensor 305 is mounted outside the passenger compartment of the own vehicle and detects, for example, obstacles around the vehicle. The radar sensor 305 corresponds to, for example, a millimeter-wave radar.

The first yaw rate sensor 310 and the second yaw rate sensor 315 detect the travelling state of the own vehicle. In the present embodiment, the "travelling state" refers to the state of the own vehicle during control of the autonomous driving, such as the state in which the forward direction of the own vehicle is oriented in the left direction with respect to the vehicle fore-and-aft direction, the state in which the own vehicle is accelerating, and the current travelling position of the own vehicle.

The first yaw rate sensor 310 is used for controlling stabilization of the vehicle attitude of the own vehicle. The first yaw rate sensor 310 detects the angular velocity caused by the yaw motion of the own vehicle. The autonomous driving control section 40, which will be described below, determines the attitude of the own vehicle using the detection result of the first yaw rate sensor 310 and controls the automated travelling of the own vehicle based on the attitude.

The second yaw rate sensor 315 is used for detecting the position of the own vehicle. The second yaw rate sensor 315 is constituted by a gyroscope sensor as an example. An own vehicle position detection section 50, which will be described below, detects the own vehicle position using the detection result of the second yaw rate sensor 315 and the detection result of a non-illustrated vehicle speed sensor. In the present embodiment, the first yaw rate sensor 310 and the second yaw rate sensor 315 correspond to a more specific concept of a first sensor in CLAIMS.

The drive source 200 is installed in the own vehicle and outputs power necessary for the travelling of the own vehicle. The drive source 200 corresponds to, for example, an engine or a motor. The steering wheel 205 is installed in the own vehicle and is used for controlling the direction of the own vehicle. More specifically, based on the target yaw rate received upon operation of the steering wheel 205, the steering angle that satisfies the target yaw rate is calculated to control the orientation of the own vehicle. The brake 210 is installed in the own vehicle and is used for decelerating the vehicle and braking to a stop.

The malfunction state detection section 10 detects whether there is a malfunction in the first yaw rate sensor 310 and the second yaw rate sensor 315. More specifically, the malfunction state detection section 10 acquires a malfunction presence/absence notification output from each of the yaw rate sensors 310 and 315 to detect whether a malfunction occurred. Furthermore, the malfunction state detection section 10 detects whether there is an alternative sensor and the performance of the alternative sensor.

The travelling condition determining section 20 determines the travelling condition of the own vehicle. In the present embodiment, the "travelling condition" refers to the condition of the own vehicle during autonomous driving control, such as the condition in which the vehicle is stopped, travelling at a low speed, which is a vehicle speed less than a predetermined vehicle speed, about to change the lane, turning left, turning right, travelling straight at the intersection, following a forward vehicle, following the path to the destination, and is driven to avoid a collision with a forward vehicle. The travelling condition determining section 20 determines the travelling condition using the detection results of the image sensor 300, the radar sensor 305, the first yaw rate sensor 310, and the second yaw rate sensor 315, and map information, and the like. For example, the travelling condition determining section 20 detects the relative movement state of the own vehicle by comparing the own vehicle and a target object around the own vehicle using the detection result of the image sensor 300 so as to determine the travelling condition. More specifically, in the taken images of the image sensor 300, if an image that is detected when the own vehicle travels across a lane marking is detected, the travelling condition determining section 20 may determine that the own vehicle is changing lane. For example, the taken images of the image sensor 300 may be repeatedly detected for a predetermined time period. If the lane on the right side of the own vehicle moves to the left side of the own vehicle as time passes, the travelling condition determining section 20 may determine that the own vehicle performed a lane change to the right lane.

The manual driving control section 30 controls the own vehicle in accordance with manual driving by the driver of the own vehicle. More specifically, the manual driving control section 30 controls the vehicle by controlling various drive mechanisms in accordance with the operation of, for example, the steering wheel 205, the acceleration pedal, and the brake by the driver.

The autonomous driving control section 40 performs the autonomous driving by controlling the automated travelling of the own vehicle. More specifically, the autonomous driving control section 40 controls the drive mechanisms, such as the engine, the brake 210, and a transmission, using the detection results of the sensors 300, 305, 310, and 315.

The autonomous driving control section 40 includes an acceleration/deceleration control section 41, a path following control section 42, a lane change control section 43, a left/right turn control section 44, a lane departure suppression control section 45, a collision avoidance control section 46, a preceding vehicle selecting and following travel control section 47, and a collision warning control section 48.

In the present embodiment, the autonomous driving control section 40 controls two different autonomous driving modes including normal autonomous driving and emergency autonomous driving. The "normal autonomous driving" refers to the autonomous driving performed when a malfunction is detected neither in the first yaw rate sensor 310 nor in the second yaw rate sensor 315. The "emergency autonomous driving" refers to the autonomous driving performed when a malfunction is detected in the first yaw rate sensor 310 or in the second yaw rate sensor 315. In an autonomous driving assistance process, which will be described below, if a malfunction is detected in the first yaw rate sensor 310 or in the second yaw rate sensor 315 while executing the normal autonomous driving, the autonomous driving control section 40 switches from the autonomous driving in a normal condition to the autonomous driving in a malfunction condition and performs the autonomous driving.

In the emergency autonomous driving, the autonomous driving is performed in which the driving manner is changed in accordance with the travelling condition determined by the travelling condition determining section 20. In the present embodiment, the "driving manner" refers to the manner of various driving operations performed when the vehicle travels. For example, the driving manner related to the changing of the vehicle speed includes increasing the vehicle speed, keeping the vehicle speed constant, and decreasing the vehicle speed. Additionally, for example, the driving manner related to the lane change includes a state of permitting the lane change and a state of prohibiting the lane change. Furthermore, for example, the driving manner related to collision avoidance includes a state of permitting a steering operation for avoiding a collision and a state of prohibiting a steering operation for avoiding a collision. The detailed description of the emergency autonomous driving will be given below.

The acceleration/deceleration control section 41 controls the vehicle speed of the own vehicle. More specifically, the acceleration/deceleration control section 41 detects the condition of the lane in which the own vehicle is travelling and the surrounding condition of the own vehicle using the detection results of the image sensor 300 and the radar sensor 305, and controls a non-illustrated acceleration pedal or the brake 210, to accelerate or decelerate the own vehicle.

The path following control section 42 controls to guide the own vehicle to the destination desired by the driver. More specifically, the path following control section 42 performs the automated travelling to the destination designated by the driver based on the map information to guide the own vehicle to the destination.

The lane change control section 43 controls changing of the travelling lane of the own vehicle. More specifically, the lane change control section 43 detects the surrounding vehicles of the own vehicle and the lane markings of the lane in which the vehicle is travelling using the detection results of the image sensor 300 and the radar sensor 305, and operates the steering wheel 205 toward the target lane, to change the travelling lane of the own vehicle.

The left/right turn control section 44 controls the execution of a right turn or a left turn. More specifically, the left/right turn control section 44 detects the shape of the intersection using the detection results of the image sensor 300 and, for example, the non-illustrated map information, and operates the steering wheel 205 in accordance with the detected shape, to turn right or left.

The lane departure suppression control section 45 controls to suppress the departure of the own vehicle from the travelling lane. More specifically, the lane departure suppression control section 45 operates the steering wheel 205 to maintain travelling in the lane in which the vehicle is travelling, so that departure from the lane in which the vehicle is travelling to another lane is suppressed.

The collision avoidance control section 46 controls to avoid a collision with a vehicle ahead of the own vehicle and a surrounding obstacle of the own vehicle and the like. More specifically, the collision avoidance control section 46 detects the surrounding condition of the own vehicle using the detection results of the image sensor 300 and the radar sensor 305, and controls the steering wheel 205 and the brake 210, to avoid a collision with the forward vehicle or the surrounding obstacle of the own vehicle and the like.

The preceding vehicle selecting and following travel control section 47 controls the vehicle to follow a preceding vehicle selected by the driver. More specifically, the preceding vehicle selecting and following travel control section 47 performs automated travelling so as to keep the distance between the preceding vehicle and the own vehicle at a predetermined distance by controlling the vehicle speed by controlling the brake 210 and the non-illustrated acceleration pedal.

If it is detected that the own vehicle may possibly collide with, for example, an obstacle, the collision warning control section 48 warns the driver and surroundings of the own vehicle. More specifically, if it is determined that it is difficult to avoid a collision by the collision avoidance control section 46, the collision warning control section 48 gives a warning by controlling, for example, a horn.

Figure 2:
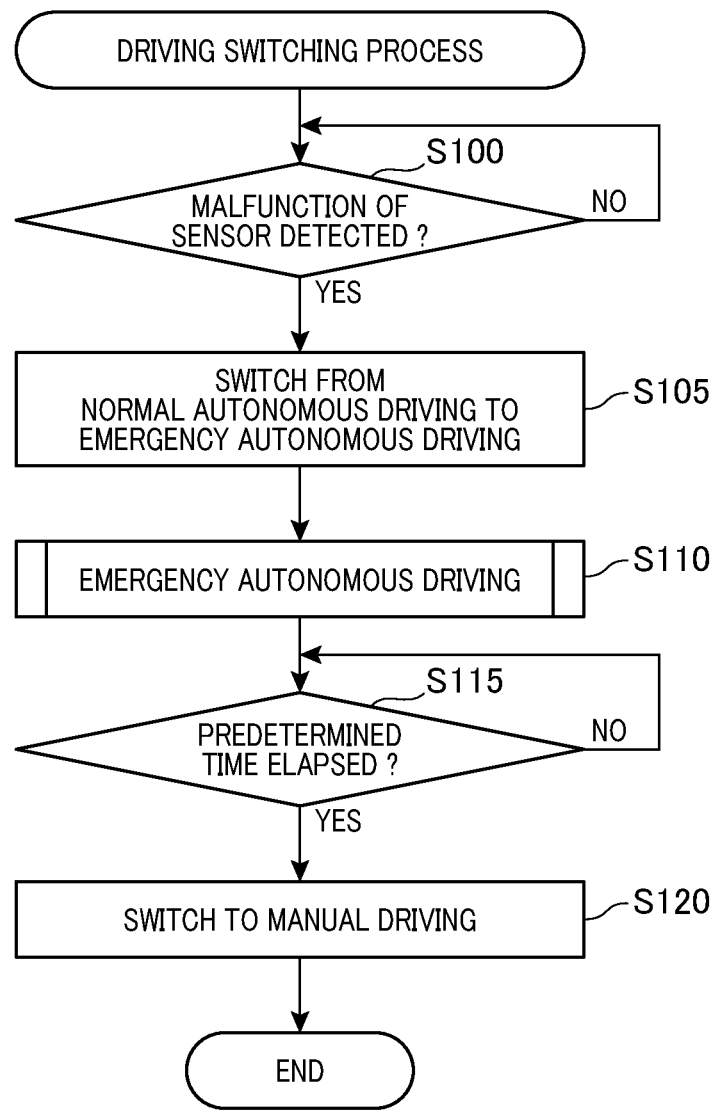
FIG. 2 is a flowchart showing a processing procedure of a switching process from autonomous driving to manual driving.

A2. Driving Switching Process:

When a user presses a predetermined button provided in a passenger compartment of the own vehicle, the normal autonomous driving is started. When the normal autonomous driving is started, the driving switching process shown in FIG. 2 is started. The driving switching process is a process as follows. That is, in a case in which a malfunction of the first yaw rate sensor 310 or the second yaw rate sensor 315 is detected while the normal autonomous driving is executed, the normal autonomous driving is switched to the emergency autonomous driving. After that, if a predetermined condition is satisfied, the process stops the own vehicle or switches to the manual driving by the driver.

As shown in FIG. 2, the malfunction state detection section 10 determines whether a malfunction of the first yaw rate sensor 310 or the second yaw rate sensor 315 (hereinafter, simply referred to as the sensor malfunction) is detected (step S100). More specifically, the malfunction state detection section 10 acquires a malfunction presence/absence notification from each of the first yaw rate sensor 310 and the second yaw rate sensor 315. If the malfunction state detection section 10 detects information indicating that a malfunction exists in either of the acquired malfunction presence/absence notifications, it is determined that the sensor malfunction is detected. In contrast, if the malfunction state detection section 10 detects information showing that a malfunction does not exist in either the acquired malfunction presence/absence notifications, it is determined that the sensor malfunction is not detected. If it is determined that no sensor malfunction is detected (step S100: NO), the process returns to before the execution of step S100, and the normal autonomous driving is continued until it is determined that a sensor malfunction is detected. If it is determined that the sensor malfunction is detected (step S100: YES), the autonomous driving control section 40 switches from the normal autonomous driving to the emergency autonomous driving (step S105).

Figure 3:
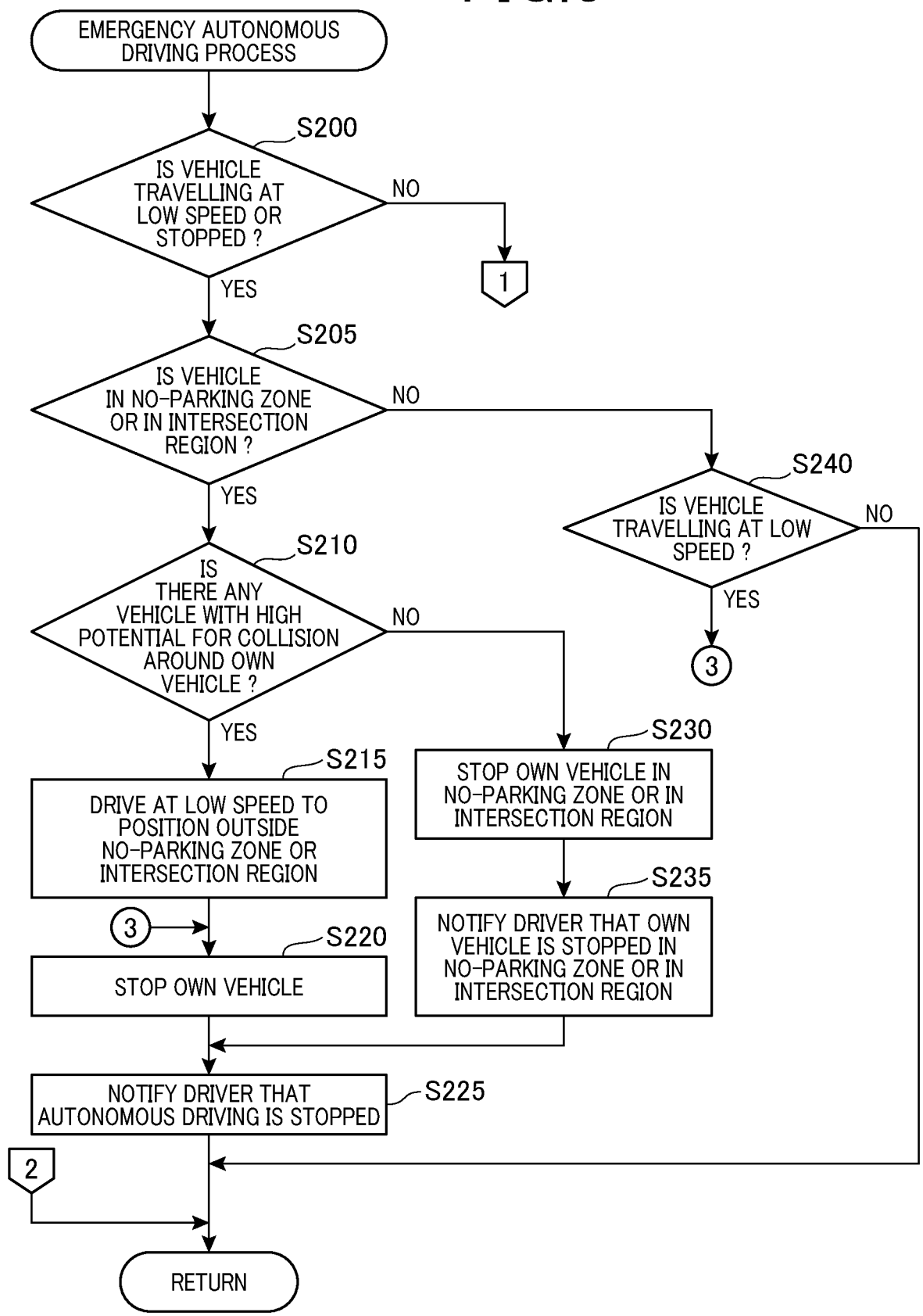
FIG. 3 is a flowchart showing a detailed processing procedure of an autonomous driving process during a malfunction condition.

If the autonomous driving process during a malfunction condition shown in FIG. 3 is started, the travelling condition determining section 20 determines whether the vehicle is travelling at a low speed or the vehicle is stopped (step S200). More specifically, the travelling condition determining section 20 acquires the vehicle speed of the own vehicle using the non-illustrated vehicle speed sensor. If the vehicle speed of the own vehicle is less than or equal to a predetermined vehicle speed, it is determined that the vehicle is travelling at a low speed. In the present embodiment, the predetermined vehicle speed is 15 km/h. The predetermined vehicle speed does not necessarily have to be 15 km/h, but may be any value greater than 0 km/h. If the vehicle speed of the own vehicle is 0 km/h for a predetermined time period, and the engine of the own vehicle is running, it is determined that the vehicle is stopped.

If it is determined that the vehicle is travelling at a low speed or the vehicle is stopped (step S200: YES), the travelling condition determining section 20 determines whether the vehicle is in a no-parking zone or in an intersection region (step S205). In the present embodiment, the determination of whether the vehicle is in the no-parking zone or in the intersection region is made using the taken image of the image sensor 300. For example, in the taken image, if a white line indicating the no-parking zone or a sign of the no-parking zone is detected, it is determined that the vehicle is in the no-parking zone. In contrast, if a white line indicating the inside of the no-parking zone or a sign of the no-parking zone is not detected, it is determined that the vehicle is not in the no-parking zone. Furthermore, for example, if a traffic light, a stop line, or a white line of a crosswalk is detected in the taken image, it is determined that the vehicle is in the intersection region. In contrast, if a traffic light, a stop line, or a white line of a crosswalk is not detected, it is determined that the vehicle is not in the intersection region. The determination of whether the vehicle is in the no-parking zone or in the intersection region may be made using the map information of a navigation device installed in the own vehicle or using a global positioning system (GPS).

If it is determined that the vehicle is in the no-parking zone or in the intersection region (step S205: YES), the travelling condition determining section 20 determines whether there is any vehicle with a high potential for collision around the own vehicle (step S210). More specifically, the travelling condition determining section 20 uses the detection results of the image sensor 300 and the radar sensor 305 to detect vehicles (other vehicles) around the own vehicle. If another vehicle is detected around the own vehicle, the vehicle speed of the other vehicle is calculated to determine whether there is time for the other vehicle to avoid colliding with the own vehicle if the own vehicle stops. The time for avoiding a collision may be calculated based on, for example, a predicted deceleration, the distance between the own vehicle and the other vehicle, and the relative speed of the other vehicle. If it is determined that there is no time for avoiding a collision, it is determined that there is a vehicle with a high potential for collision around the own vehicle. In contrast, if it is determined that there is time for avoiding a collision, it is determined that there is no vehicle with a high potential for collision around the own vehicle.

If it is determined that there is a vehicle with a high potential for collision around the own vehicle (step S210: YES), the autonomous driving control section 40 drives the own vehicle at a low speed to a position outside the no-parking zone or the intersection region (step S215). More specifically, the autonomous driving control section 40 performs automated travelling while keeping the own vehicle at a low speed by controlling the non-illustrated acceleration pedal and the brake 210, and also operates the steering wheel 205 to guide the own vehicle outside the no-parking zone or intersection region. The outside of the no-parking zone is a place different from the inside of the no-parking zone and refers to, for example, a place separate from the inside of the no-parking zone by a predetermined distance. The outside of the intersection region is a place different from the inside of the intersection region and refers to, for example, a place separate from the inside of the intersection region by a predetermined distance.

After step S215 is executed, the autonomous driving control section 40 stops the own vehicle (step S220). More specifically, the autonomous driving control section 40 activates the brake 210 to stop the own vehicle. After step S220 is executed, the autonomous driving control section 40 notifies the driver that the autonomous driving is stopped (step S225). More specifically, the autonomous driving control section 40 indicates, on a non-illustrated display installed in the own vehicle, a notification that the autonomous driving is stopped, and that the vehicle has stopped because a sensor malfunction has been detected. The notification may be indicated on a display of the navigation system installed in the own vehicle. After step S225 is executed, the autonomous driving process during a malfunction condition is terminated, and step S115 shown in FIG. 2 is executed.

As shown in FIG. 3, in the above-mentioned step S210, if it is determined that there is no vehicle with a high potential for collision around the own vehicle (step S210: NO), the autonomous driving control section 40 stops the own vehicle in the no-parking zone or in the intersection region (step S230). More specifically, like in the above-mentioned step S225, the autonomous driving control section 40 activates the brake 210 to stop the own vehicle. After step S230 is executed, the autonomous driving control section 40 notifies the driver that the own vehicle is stopped in the no-parking zone or in the intersection region (step S235). More specifically, like in the above-mentioned step S225, the autonomous driving control section 40 indicates, on the non-illustrated display installed in the own vehicle, a notification that autonomous driving has been stopped, and the vehicle is stopped in the no-parking zone or in the intersection region due to a sensor malfunction having been detected.

In the above-mentioned step S205, if it is determined that the vehicle is not in the no-parking zone nor in the intersection region (step S205: NO), the travelling condition determining section 20 determines whether the vehicle is travelling at a low speed (step S240). Since step S240 is executed only when it is determined that the vehicle is travelling at a low speed or that the vehicle is stopped at step S200, it is determined whether the vehicle is travelling at a low speed to identify whether it is a case in which the vehicle is travelling at a low speed or a case in which the vehicle is stopped. The travelling condition determining section 20 acquires the vehicle speed of the own vehicle using the non-illustrated vehicle speed sensor like in the above-mentioned step S200 to determine whether the vehicle is travelling at a low speed. It may be determined whether the vehicle is travelling at a low speed using the detection result acquired at step S200. If it is determined that the vehicle is travelling at a low speed (step S240: YES), the above-mentioned step S220 is executed, and the autonomous driving control section 40 stops the own vehicle (step S220). If it is determined that the vehicle is not travelling at a low speed, that is, if it is determined that the vehicle is stopped (step S240: NO), the brake 210 is controlled to keep the own vehicle stopped. Subsequently, like after the execution of the above-mentioned step S225, the autonomous driving process during a malfunction condition is terminated and step S115 shown in FIG. 2 is executed.

As shown in FIG. 3, in the above-mentioned step S200, if it is determined that the vehicle is not travelling at a low speed nor the vehicle is stopped (step S200: NO), as shown in FIG. 4, the travelling condition determining section 20 determines whether the condition corresponds to any of the travelling conditions including that the vehicle is travelling straight, travelling along a curve, changing lane, and travelling through an intersection (step S245). More specifically, if the steering angle of the steering wheel 205 matches the vehicle forward direction, it is determined that the vehicle is travelling straight. If the steering angle of the steering wheel 205 is at a predetermined angle or more with respect to the vehicle fore-and-aft direction, or if the detection result of the first yaw rate sensor 310 is equal to a predetermined angular velocity, it is determined that the vehicle is travelling along a curve. If the detection result of the image sensor 300 includes an image detected when the own vehicle travels across a lane marking, it is determined that the vehicle is changing lane. If it is determined that the position of the own vehicle is in an intersection region using the map information or the GPS information, it is determined that the vehicle is travelling through an intersection. Also, if a white line of the intersection is detected in the detection result of the image sensor 300, it is determined that the vehicle is travelling through an intersection.

If it is determined that the condition corresponds to any of the travelling conditions including that the vehicle is travelling straight, travelling along a curve, changing the lane, and travelling through the intersection (step S245: YES), the autonomous driving control section 40 performs autonomous driving in which the driving manner is changed in accordance with the travelling condition, that is, the emergency autonomous driving (step S250).

According to the present embodiment, in the emergency autonomous driving, the driving manner is changed as shown in the following (A) to (H) compared with before the sensor malfunction is detected.

(A) Decreasing the speed of the own vehicle (B) If the position of the own vehicle is in the intersection region, changing from enabling decrease of the speed of the own vehicle to disabling decrease of the speed of the own vehicle (C) Changing from a permitting state to a prohibiting state of an additional lane change (D) If the determined travelling condition is a case in which the vehicle is changing lane, changing from a permitting state to a prohibiting state of changing the steering angle of the own vehicle (E) Changing from a permitting state to a prohibiting state of an additional right and left turn (F) Changing from a permitting state to a prohibiting state of braking of the own vehicle, for avoiding a collision with the forward vehicle (G) Changing from a permitting state to a prohibiting state of additional steering of the own vehicle, for avoiding a collision with the forward vehicle (H) Changing from a permitting state to a prohibiting state of forward vehicle following travelling The details of the above-mentioned (A) to (H) will be described below.

In regard to the above-mentioned (A), the acceleration/deceleration control section 41 controls the vehicle speed to be decreased. If a malfunction is detected in the yaw rate sensor 310 or 315, the path along which the vehicle is travelling cannot be tracked properly. Thus, the own vehicle may depart from the path along which the own vehicle is travelling and may possibly collide with an obstacle, such as another vehicle. In this case, it is difficult to switch to manual driving safely. Thus, the vehicle speed is decreased to minimize the departure from the path along which the own vehicle is travelling.

In regard to the above-mentioned (B), the acceleration/deceleration control section 41 controls so as to prohibit decrease in the speed if the own vehicle is travelling through the intersection region. This is because if the own vehicle is decelerated in the intersection region, the own vehicle may possibly collide with the vehicle behind. Thus, if the position of the vehicle is in the intersection region, the vehicle speed is prevented from being decreased, to inhibit decrease in safety.

In regard to the above-mentioned (C), the lane change control section 43 controls so as to prohibit an additional lane change. If a malfunction is detected in the first yaw rate sensor 310, the vehicle attitude of the own vehicle cannot be accurately detected. Thus, permitting a lane change may result in dangerous steering, thus causing unexpected vehicle movement, which may possibly cause the own vehicle to collide with an obstacle, such as another vehicle. For this reason, an additional lane change is prohibited, to inhibit decrease in safety.

In regard to the above-mentioned (D), the lane change control section 43 controls so as to prohibit the changing of the steering angle of the own vehicle if the own vehicle is changing lane. This is because if a malfunction is detected in the first yaw rate sensor 310, the vehicle attitude of the own vehicle cannot be accurately detected, and thus the own vehicle may possibly travel in an unexpected direction and collide with an obstacle, such as another vehicle. Thus, by fixing the steering angle, the lane change is executed while inhibiting decrease in safety.

In regard to the above-mentioned (E), the left/right turn control section 44 controls so as to prohibit an additional right turn and left turn. If a malfunction is detected in the first yaw rate sensor 310, the vehicle position of the own vehicle cannot be accurately detected. Thus, permitting the right turn or the left turn may possibly result in dangerous steering, thus causing an unexpected vehicle movement, which may possibly cause the own vehicle to collide with an obstacle, such as another vehicle. For this reason, an additional right and left turn is prohibited, to inhibit decrease in safety.

In regard to the above-mentioned (F), the collision avoidance control section 46 controls so as to prohibit the execution of the brake 210 for avoiding a collision with the forward vehicle by stopping the operation of the automated brake. If a malfunction is detected in the first yaw rate sensor 310, the vehicle attitude stabilizing control of the own vehicle is stopped. Thus, operating the automated brake may possibly promote spinning of the vehicle. For this reason, the operation of the automated brake is stopped, to inhibit decrease in the stability of the vehicle attitude.

In regard to the above-mentioned (G), the collision avoidance control section 46 controls so as to prohibit an additional steering for avoiding a collision with the forward vehicle. More specifically, the collision avoidance control section 46 continues controlling the steering that is being executed, but does not control an additional steering for avoiding a collision with the forward vehicle. The steering that is being executed is controlled based on the accurate vehicle attitude detected before the occurrence of a malfunction in the sensor. However, an additional steering when a malfunction is detected in the sensor cannot be controlled based on an accurate vehicle attitude. This may result in dangerous steering, thus causing an unexpected vehicle movement, which may possibly cause the vehicle to collide with an obstacle, such as another vehicle. For this reason, an additional steering for avoiding a collision with the forward vehicle is prohibited, to inhibit decrease in safety.

In regard to the above-mentioned (H), the preceding vehicle selecting and following travel control section 47 controls so as to prohibit selecting the preceding vehicle and travelling to follow the selected preceding vehicle. This is because if a malfunction is detected in the sensor, a vehicle that is travelling on a lane different from the lane in which the own vehicle is travelling may possibly be selected as the preceding vehicle erroneously. Additionally, travelling to follow the erroneously selected preceding vehicle may cause departure from the lane or the increase in the vehicle speed, which decreases safety. Thus, selecting the preceding vehicle and travelling to follow the selected preceding vehicle are prohibited, to inhibit decrease in safety.

In the emergency autonomous driving, the lane departure suppression control section 45, the collision warning control section 48, and the path following control section 42 execute the same processes as in the normal autonomous driving. This is because since these control sections perform the processes without using the first yaw rate sensor 310, even if a malfunction is detected in the first yaw rate sensor 310, the same processes as in the normal autonomous driving can be executed.

After the above-mentioned step S250 is executed, the autonomous driving process during a malfunction condition (step S110) is terminated as shown in FIG. 3, and step S115 shown in FIG. 2 is executed.

As shown in FIG. 2, the autonomous driving control section 40 determines whether a predetermined time has elapsed (step S115). More specifically, the autonomous driving control section 40 determines whether a predetermined time, such as 4 seconds, 10 seconds, or 3 minutes, has elapsed from when the execution of emergency autonomous driving (step S110) is started. If it is determined that the predetermined time has not elapsed (step S115: NO), the process returns to before the execution of step S115, and emergency autonomous driving is continued until it is determined that the predetermined time has elapsed. In contrast, if it is determined that the predetermined time has elapsed (step S115: YES), the autonomous driving control section 40 switches to manual driving (step S120). The predetermined time is not limited to 4 seconds, 10 seconds, or 3 minutes as described above, but may be set to any given time.

If the autonomous driving is switched to the manual driving at step S120, the manual driving control section 30 controls the own vehicle in accordance with manual driving by the driver. After step S120 is executed, the driving switching process is terminated.

With the autonomous driving assistance device 100 according to the first embodiment configured as described above, if a malfunction is detected in the first yaw rate sensor 310 during control of the autonomous driving, the autonomous driving control section 40 executes emergency autonomous driving, in which the driving manner is changed in accordance with the determined travelling condition compared with the driving manner before a malfunction is detected in the first yaw rate sensor 310, until the predetermined time elapses. After the emergency autonomous driving is terminated, either the vehicle is stopped by the autonomous driving control section 40, or manual driving is controlled by the manual driving control section 30. This inhibits decrease in the safety of the autonomous driving while the autonomous driving is switched to the manual driving.

Since switching to manual driving is after the predetermined time has elapsed from when normal autonomous driving is switched to emergency autonomous driving, the driver is given time to prepare for manual driving. This inhibits decrease in safety.

Furthermore, if the own vehicle is in the travelling condition in which the vehicle is travelling at a low speed, the vehicle is travelling in the intersection region or in the no-parking zone, and there is a vehicle with a high potential for collision around the own vehicle, the own vehicle is moved to a place separated by a predetermined distance from the position in the intersection region or to a place separated by a predetermined distance from the position in the no-parking zone and then stopped. Thus, compared with a configuration in which the own vehicle is stopped in the intersection region or in the no-parking zone, the own vehicle is prevented from hindering passage of other vehicles. This also prevents the occurrence of a collision between the own vehicle and another vehicle in the intersection region or in the no-parking zone.

Additionally, if the own vehicle is stopped, the vehicle can be switched to manual driving while keeping the own vehicle stopped. Thus, if a malfunction is detected in the first yaw rate sensor 310 during control of the autonomous driving, the own vehicle is prevented from moving, which is the safest vehicle control. This inhibits decrease in the safety of the autonomous driving while autonomous driving is switched to manual driving.

B. Second Embodiment

B1. Configuration of System:

Since the autonomous driving assistance device 100 according to a second embodiment is the same as the autonomous driving assistance device 100 according to the first embodiment of FIG. 1, detailed description will be omitted.

B2. Driving Switching Process:

The driving switching process of the second embodiment differs from the driving switching process of the first embodiment in the contents of the process for determining whether there is a malfunction in the sensor (step S100) and the contents of the autonomous driving process during a malfunction condition (step S110). The same processes as the processes according to the first embodiment are given the same reference numerals, and detailed description will be omitted.

In determining whether there is a malfunction in the sensor according to the second embodiment shown in FIG. 5, the difference in the values indicated by the sensors of the first yaw rate sensor 310 and the second yaw rate sensor 315 is used to determine whether there is a malfunction in the first yaw rate sensor 310 and in the second yaw rate sensor 315. The malfunction state detection section 10 acquires a sensor value of the first yaw rate sensor 310 (step S300). More specifically, the malfunction state detection section 10 refers to the detection result of a non-illustrated sensor mounted on the first yaw rate sensor 310 to acquire the value indicated by the first yaw rate sensor 310. After step S300 is executed, the malfunction state detection section 10 acquires the malfunction presence/absence notification of the first yaw rate sensor 310 (step S305). More specifically, the malfunction state detection section 10 acquires the malfunction presence/absence notification output from the first yaw rate sensor 310 to detect information indicating whether there is a malfunction.

After step S305 is executed, the malfunction state detection section 10 acquires a sensor value of the second yaw rate sensor 315 (step S310). At step S310, the sensor value indicated by the second yaw rate sensor 315 is acquired through the same process as the above-mentioned step S300. After step S310 is executed, the malfunction state detection section 10 acquires the malfunction presence/absence notification of the second yaw rate sensor 315 (step S315). At step S315, the malfunction state detection section 10 acquires the malfunction presence/absence notification output from the second yaw rate sensor 315 through the same process as the above-mentioned step S305 to detect information indicating whether there is a malfunction.

After step S315 is executed, the malfunction state detection section 10 determines whether there is a malfunction in the first yaw rate sensor 310 and in the second yaw rate sensor 315 (step S320). The malfunction state detection section 10 calculates the difference in the value indicated by the first yaw rate sensor 310 and the value indicated by the second yaw rate sensor 315. If the calculated difference is greater than or equal to a predetermined threshold value, it is determined that a malfunction is detected in either of the yaw rate sensors. In this case, which of the yaw rate sensors has suffered a malfunction is determined as follows. The malfunction state detection section 10 refers to a non-illustrated map showing the correspondence between the difference between the values indicated by the yaw rate sensors 310 and 315 and the failure rate of the yaw rate sensors 310 and 315 to determine which of the yaw rate sensors has a malfunction. For example, if the difference between the values indicated by the yaw rate sensors 310 and 315 is great, it is determined that a malfunction is detected in the yaw rate sensor that is apt to cause a failure.

At step S320, if the difference between the values indicated by the sensors 310 and 315 is greater than or equal to the predetermined threshold value, and the information indicating the presence of a malfunction is detected in the malfunction presence/absence notification acquired from either of the sensors 310 and 315, it is determined that a malfunction is detected in the sensor. If the difference between the values indicated by the sensors 310 and 315 is less than the predetermined threshold value, or the information indicating the absence of a malfunction is detected in both the malfunction presence/absence notifications acquired from the sensors 310 and 315, it is determined that a malfunction is not detected in the sensors.

The autonomous driving process during a malfunction condition according to the second embodiment shown in FIG. 6 differs from the autonomous driving process during a malfunction condition according to the first embodiment shown in FIGS. 3 and 4 in that step S200a is executed instead of step S200, in that steps S205 to S250 are omitted, and in that step S260 is additionally executed. The same processes as the processes of the first embodiment are given the same reference numerals, and detailed description will be omitted.

In the autonomous driving process during a malfunction condition according to the second embodiment, the autonomous driving is performed using the yaw rate sensor in which a malfunction is not detected. At this time, the predetermined driving manner is controlled to be gradually changed. As shown in FIG. 6, in the emergency autonomous driving of the second embodiment, first, the autonomous driving control section 40 prohibits a lane change and a right and left turn (step S200a). This is because if a malfunction is detected in the first yaw rate sensor 310, it is difficult to control the stability of the own vehicle compared with the normal autonomous driving. Thus, the autonomous driving control section 40 controls so that the lane change and the right and left turn cannot be performed.

After step S200a is executed, the autonomous driving control section 40 prohibits lane departure prevention, preceding vehicle selecting and following travel, and collision avoidance (step S260) while performing the autonomous driving using the yaw rate sensor in which a malfunction is not detected. For example, if a malfunction is detected in the first yaw rate sensor 310, the autonomous driving control section 40 performs the emergency autonomous driving using the second yaw rate sensor 315 in which a malfunction is not detected until switching to manual driving. Furthermore, the autonomous driving control section 40 controls so that lane departure prevention, preceding vehicle selecting and following travel, and collision avoidance cannot be performed. After step S260 is executed, step S115 shown in FIG. 2 is executed.

The autonomous driving assistance device 100 of the second embodiment described above has the same advantages as the above-mentioned autonomous driving assistance device 100 of the first embodiment. Additionally, since whether there is a malfunction in the first yaw rate sensor 310 or in the second yaw rate sensor 315 is detected based on the difference between the value indicated by the first yaw rate sensor 310 and the value indicated by the second yaw rate sensor 315, whether there is a malfunction in the yaw rate sensors is easily detected.

Furthermore, if a malfunction is detected in the first yaw rate sensor 310, a lane change and a right and left turn that are greatly affected by the decrease in the stability of the vehicle attitude are prohibited at an early point in time after the malfunction in the sensor is detected. Thus, compared with a case in which the lane change and the right and left turn remain permitted when a malfunction is detected in the sensor, safety is inhibited from being decreased. Moreover, after the lane change and the right and left turn are prohibited, lane departure prevention, preceding vehicle selecting and following travel, and collision avoidance that are relatively less affected by the malfunction in the first yaw rate sensor 310 are prohibited. Thus, a user is provided with the functions that can be executed using the second yaw rate sensor 315 in which a malfunction is not detected as long as possible. This inhibits the decrease in the convenience to the user.

C. Third Embodiment

An autonomous driving assistance device 100a according to a third embodiment shown in FIG. 7 differs from the autonomous driving assistance device 100 according to the first embodiment shown in FIG. 1 in that the autonomous driving assistance device 100a is not directly connected to the second yaw rate sensor 315, but is indirectly connected to the second yaw rate sensor 315 via a second yaw rate sensor ECU 320. Since other structures of the autonomous driving assistance device 100a according to the third embodiment are the same as the structures of the autonomous driving assistance device 100 of the first embodiment, the same reference numerals are given to the same components, and detailed description will be omitted.

The second yaw rate sensor ECU 320 controls the second yaw rate sensor 315. The second yaw rate sensor ECU 320 and the second yaw rate sensor 315 are separately formed. In the third embodiment, the second yaw rate sensor 315 is located close to the center of gravity of the vehicle. In the present embodiment, "close to the center of gravity of the vehicle" refers to, for example, the position within a range of 50 cm from the center of gravity of the vehicle. Instead of 50 cm, for example, any given value may be set taking the vehicle size into consideration. The second yaw rate sensor 315 does not necessarily have to be located close to the center of gravity of the vehicle, but may be located close to the first yaw rate sensor 310.

Since the driving switching process of the third embodiment is the same as the driving switching process of the first embodiment or the second embodiment, detailed description will be omitted.

The autonomous driving assistance device 100a of the third embodiment described above has the same advantages as the above-described embodiments. Additionally, since the second yaw rate sensor 315 is located at the position close to the center of gravity position of the vehicle, the yaw rate is precisely measured compared with a case in which the second yaw rate sensor 315 is located at a position separate from the center of gravity position of the vehicle. Furthermore, the structure in which the second yaw rate sensor 315 is located close to the first yaw rate sensor 310 reduces time required for determining whether there is a malfunction in the sensors and for switching the sensors when a malfunction is detected in either of the sensors.

D. Fourth Embodiment

An autonomous driving assistance device 100b according to a fourth embodiment shown in FIG. 8 differs from the autonomous driving assistance device 100 according to the first embodiment shown in FIG. 1 in that the autonomous driving assistance device 100b is equipped with the second yaw rate sensor 315 and functions as the own vehicle position detection section 50. Since other structures of the autonomous driving assistance device 100b of the fourth embodiment are the same as those of the autonomous driving assistance device 100 of the first embodiment, the same reference numerals are given to the same components, and detailed description will be omitted.

The second yaw rate sensor 315 differs from the second yaw rate sensor 315 of the first embodiment and the second embodiment in that the second yaw rate sensor 315 of the fourth embodiment is configured as a functional unit of the autonomous driving assistance device 100b. The specific function of the second yaw rate sensor 315 of the fourth embodiment is the same as that of the second yaw rate sensor 315 of the first embodiment and the second embodiment. Furthermore, the own vehicle position detection section 50 detects the position of the own vehicle using the detection result of the second yaw rate sensor 315.

Since the driving switching process of the fourth embodiment is the same as the driving switching process of the first embodiment or the second embodiment, detailed description will be omitted.

The autonomous driving assistance device 100b of the fourth embodiment described above has the same advantages as the above-described embodiments. Additionally, since the autonomous driving assistance device 100b is formed integrally with the second yaw rate sensor 315 and the own vehicle position detection section 50, the second yaw rate sensor 315 and the own vehicle position detection section 50 can use the CPU and the memories of the autonomous driving assistance device 100b. This reduces costs.

E. Modifications

E1. First Modification:

In each of the above-described embodiments, whether there is a malfunction in the first yaw rate sensor 310 and the second yaw rate sensor 315 is detected. However, the present disclosure is not limited to this. For example, whether there is a malfunction in the image sensor 300 or the radar sensor 305 may be detected. That is, in general, as long as the configuration detects whether there is a malfunction in the first sensor, which detects the vehicle travelling state or the surrounding condition of the vehicle, the same advantages as the above-described embodiments are achieved.

E2. Second Modification:

In the emergency autonomous driving according to the first embodiment, the driving manners of all the above-mentioned (A) to (H) are changed. However, the present disclosure is not limited to this. For example, only the above-mentioned (A) may be performed. Furthermore, for example, the above-mentioned (C) and (E) may be performed. That is, in general, as long as the driving manner of at least one of the above-mentioned (A) to (H) is changed, the same advantages as the first embodiment are achieved.

E3. Third Modification:

In the emergency autonomous driving according to the first embodiment, the left/right turn control section 44 prohibits an additional right and left turn. However, the present disclosure is not limited to this. For example, the vehicle may turn to the direction in which the steering wheel 205 of the own vehicle is oriented. Alternatively, for example, while the own vehicle is travelling in the intersection region, if the travelling lane of the own vehicle allows the vehicle to travel straight ahead, and the steering wheel 205 of the own vehicle is oriented straight ahead, the vehicle may move straight ahead. Alternatively, for example, the vehicle may be moved to a safe place such as a road shoulder. With these configurations also, the advantages that are the same as those of the first embodiment are achieved.

E4. Fourth Modification

In the emergency autonomous driving according to the first embodiment, the lane change control section 43 prohibits an additional lane change. However, the present disclosure is not limited to this. For example, when the vehicle is changing lane, the execution of changing lane may be discontinued, and the vehicle may be kept in the lane before the lane change. Alternatively, for example, the vehicle may be moved to the safer one of the lane before the lane change and the target lane. Alternatively, for example, the vehicle may travel on the white line over which the own vehicle is about to cross, or may travel while keeping a constant distance from the white line. Alternatively, for example, the autonomous driving assistance device may include a functional unit that determines a forward focus point of the driver of the own vehicle. With this configuration, if the forward focus point of the driver determined by the functional unit is inside the lane in which the vehicle is travelling, the lane change does not necessarily have to be executed. If, for example, the forward focus point of the driver is outside the lane in which the vehicle is travelling, the lane change may be executed. If, for example, the vehicle is changing lane, the steering angle may be fixed, or the steering angle does not necessarily have to be fixed. With these configurations also, the same advantages as the first embodiment are achieved.

E5. Fifth Modification:

In each of the embodiments, the travelling condition is determined using the sensors 300, 305, 310, and 315 mounted on the own vehicle. However, the present disclosure is not limited to this. For example, the travelling condition may be determined using, for example, the map information of the navigation system installed in the own vehicle and the GPS information and the like. With this configuration also, the same advantages as the above embodiments are achieved.

E6. Sixth Modification:

In the autonomous driving process during a malfunction condition according to the first embodiment, the collision avoidance control section 46 stops operation of the automated brake. However, the present disclosure is not limited to this. For example, the vehicle attitude may be estimated using a sensor which may be the alternative sensor of the first yaw rate sensor 310, and a non-illustrated steering angle sensor and the like. If it is determined that the vehicle attitude is stable, the operation of the automated brake may be continued. With this configuration also, the same advantages as the first embodiment are achieved.

E7. Seventh Modification:

In each of the embodiments, if it is determined that the predetermined time has elapsed, manual driving is switched to. However, the present disclosure is not limited to this. For example, manual driving may be switched to if the instruction for starting manual driving by the driver is detected. More specifically, manual driving may be switched to upon detection of the operation indicating that the driver is ready for manual driving, such as when the driver depresses the brake 210 or the non-illustrated acceleration pedal, or when the driver pushes a predetermined button in the passenger compartment. With this configuration also, the same advantages as the above-described embodiments are achieved.

E8. Eighth Modification:

In the second embodiment, emergency autonomous driving is performed using the second yaw rate sensor 315 in which a malfunction is not detected. However, the present disclosure is not limited to this. For example, normal autonomous driving may be performed using a sensor other than the second yaw rate sensor 315 (such as the steering angle sensor and the vehicle speed sensor). Alternatively, for example, if the performance of the autonomous driving is decreased by performing autonomous driving using a sensor, which may be the second yaw rate sensor 315, the steering angle sensor, the vehicle speed sensor, and the like, instead of the first yaw rate sensor 310, the travelling condition may be determined and the driving manner may be changed in accordance with the determined travelling condition, as in the first embodiment. With this configuration also, the same advantages as the second embodiment are achieved.

E9. Ninth Modification:

In each of the embodiments, the notification to the driver is indicated on the non-illustrated display. However, the present disclosure is not limited to this. For example, instead of or in addition to indicating the notification, an alarm may be output to notify the driver. With this configuration also, the same advantages as the above embodiments are achieved.

E10. Tenth Modification:

In each of the embodiments, the path following control section 42 controls the path tracking based on the map information. However, the present disclosure is not limited to this. For example, if a malfunction is detected in the yaw rate sensors 310 and 315, the path tracking may be performed using the alternative sensor other than the yaw rate sensors 310 and 315. Alternatively, for example, the target steering angle may be determined by estimating the yaw rate based on the steering angle and the vehicle speed to perform the path tracking. Alternatively, for example, the path tracking may be performed by determining the target steering angle through steering angle control that does not use the yaw rate. Alternatively, feedback control may be switched to feed forward control. With these configurations also, the same advantages as the above embodiments are achieved.

E11. Eleventh Modification:

In the modification 10, if a sensor that has a different sampling cycle from that of the yaw rate sensors 310 and 315 is used as the alternative sensor of the yaw rate sensors 310 and 315, the control gain may be changed in accordance with the sampling cycle. For example, if yaw rate sensors 310 and 315 having a fast sampling cycle are changed to an alternative sensor having a slow sampling cycle, the changes in the values detected by the alternative sensor become great (rough). Thus, the difference from the target value becomes great, causing the vehicle to become more apt to depart from the target path. In this case, the stability in the control property of the path tracking is decreased. Thus, decreasing the control gain to decrease the control response inhibits the decrease in the stability of the control property of the path tracking. With this configuration also, the same advantages as the above-described modification 10 are achieved.

E12. Twelfth Modification:

In the second embodiment, if a malfunction is detected in the first yaw rate sensor 310, operations such as the lane change and the right and left turn are controlled so as to be prohibited. However, the present disclosure is not limited to this. For example, if a malfunction is no longer detected in the first yaw rate sensor 310, the operations such as the lane change and the right and left turn may be controlled to be permitted. With this configuration also, the same advantages as the second embodiment are achieved.

E13. Thirteenth Modification

In the first embodiment, if the position of the own vehicle is in an intersection region, the vehicle speed is prevented from being decreased. However, the present disclosure is not limited to this. For example, the vehicle speed may be allowed to be decreased. With this configuration, the vehicle may be decelerated with the amount of decrease in the vehicle speed being reduced. With this configuration also, the same advantages as the first embodiment are achieved.

E14. Fourteenth Modification:

In the first embodiment, if the own vehicle is stopped, after execution of step S205 and step S240, the own vehicle is kept being stopped. However, the present disclosure is not limited to this. For example, after step S200 is executed, whether the own vehicle is stopped may further be determined. If it is determined that the own vehicle is stopped, the own vehicle may be kept stopped. With this configuration also, the same advantages as the first embodiment may be achieved.

E15. Fifteenth Modification:

In each of the embodiments and the modifications, some or all of the functions and the processes achieved by software may be achieved by hardware. Alternatively, some or all of the functions and the processes achieved by hardware may be achieved by software. The hardware may be, for example, various circuits including an integrated circuit, a discrete circuit, or a circuit module of these circuits combined together. If some or all of the functions of the present disclosure are achieved by software, the software (computer programs) may be provided in the form stored in a computer readable storage medium. The "computer readable storage medium" includes, besides a portable storage medium, such as a flexible disk and a CD-ROM, various internal storage devices in the computer, such as a RAM and a ROM, and external storage devices fixed to the computer, such as a hardware disk. That is, the "computer readable storage medium" has a wide meaning including any storage medium that can secure data packets in a non-transitory manner.

The present disclosure is not limited to the above embodiments and the modifications and can be achieved in various forms without departing from the scope of the disclosure. For example, the technical feature of the embodiment and the modification that corresponds to the technical feature of each aspect described in "SUMMARY OF THE INVENTION" may be replaced or combined as required for solving some or all of the above problems or for achieving some or all of the above advantages. Unless the technical feature is described as essential in the description, the technical feature may be eliminated as required.

What is claimed is:

1. An autonomous driving assistance device installable to a vehicle, comprising:
   a manual driving control section configured to control the vehicle in accordance with manual driving by a driver of the vehicle;
   an autonomous driving control section configured to control autonomous driving of the vehicle using a detection result of a first sensor which detects a travelling state of the vehicle or a surrounding condition of the vehicle, the first sensor including a first yaw rate sensor used for stabilization control of the vehicle and a second yaw rate sensor used for position detection of the vehicle;
   a malfunction state detection section configured to detect whether there is a malfunction in the first sensor; and
   a travelling condition determining section configured to determine a travelling condition of the vehicle, wherein
   in response to it being detected that there is a malfunction in the first sensor during control of the autonomous driving of the vehicle, the autonomous driving control section is configured to execute emergency autonomous driving until a predetermined condition is satisfied while changing, based on the determined travelling condition, a driving manner of the emergency autonomous driving as compared with a driving manner of the autonomous driving executed before no malfunctions are detected in the first sensor,
   after the emergency autonomous driving is terminated, the autonomous driving assistance device being configured to selectively execute one of:
   causing the autonomous driving control section to stop the vehicle; and
   causing the manual driving control section to control the manual driving, and
   the autonomous driving control section is configured to:
   in response to a malfunction being detected in either one of the first yaw rate sensor and the second yaw rate sensor, control the emergency autonomous driving using the other one of the first and second yaw rate sensors;
   estimate a vehicle attitude using the other one of the first and second yaw rate sensors and a steering angle sensor installed to the vehicle, and determine whether the estimated vehicle attitude is stable;
   in response to determining that the estimated vehicle attitude is stable, continue a permitting state of braking of the vehicle for avoiding a collision with a forward vehicle that is travelling ahead of the vehicle; and
   in response to determining that the estimated vehicle attitude is not stable, change from the permitting state to a prohibiting state of braking of the vehicle.

* * * * *